(12) United States Patent
Birch (10) Patent No.: US 8,564,546 B1
(45) Date of Patent: Oct. 22, 2013

(54) MULTIPLE TOUCH RESOLVE (75) Inventor: Robert Birch, Seattle, WA (US)

(73) Assignee: Cypress Semiconductor Corporation, San Jose, CA (US)

(*) Notice: Subject to any disclaimer, the term of this patent is extended or adjusted under 35 U.S.C. 154(b) by 666 days.

(21) Appl. No.: 12/395,304

(22) Filed: Feb. 27, 2009

Related U.S. Application Data (60) Provisional application No. 61/067,502, filed on Feb. 27, 2008.

(51) Int. Cl.
*G09G 5/00* (2006.01)

(52) U.S. Cl.
USPC ........... 345/173; 345/156; 345/157; 345/174; 382/312; 382/313; 382/314; 178/18.01; 178/18.03; 178/18.06

(58) Field of Classification Search
USPC .......................... 345/156–173; 382/312–314; 178/18.01–18.06
See application file for complete search history.

(56) References Cited

U.S. PATENT DOCUMENTS

| 5,463,388 | A  | * | 10/1995 | Boie et al. ................ 341/33 |
| 5,831,600 | A  | * | 11/1998 | Inoue et al. ................ 345/173 |
| 8,120,584 | B2 | * | 2/2012  | Grivna et al. ............... 345/169 |
| 2003/0210235 | A1 | * | 11/2003 | Roberts ..................... 345/173 |
| 2006/0097991 | A1 |   | 5/2006  | Hotelling et al. |
| 2007/0229466 | A1 | * | 10/2007 | Peng et al. .................. 345/173 |
| 2008/0012835 | A1 | * | 1/2008  | Rimon et al. ................ 345/173 |
| 2008/0062140 | A1 | * | 3/2008  | Hotelling et al. ............. 345/173 |
| 2008/0158174 | A1 | * | 7/2008  | Land et al. .................. 345/173 |
| 2008/0179112 | A1 | * | 7/2008  | Qin et al. .................... 178/18.06 |
| 2008/0192018 | A1 | * | 8/2008  | Park et al. ................... 345/173 |
| 2009/0174675 | A1 | * | 7/2009  | Gillespie et al. ............. 345/173 |
| 2010/0156839 | A1 | * | 6/2010  | Ellis .......................... 345/174 |
| 2010/0289769 | A1 | * | 11/2010 | Watanabe ..................... 345/174 |
| 2011/0063249 | A1 | * | 3/2011  | Chou et al. ................... 345/174 |

OTHER PUBLICATIONS

CSR User Module, CSR v1.0, CY8C21x34 Data Sheet, Cypress Semiconductor Corporation, Oct. 6, 2005, pp. 1-36.

* cited by examiner

*Primary Examiner* — Joseph Feild
*Assistant Examiner* — Linh N Hoffner (57) ABSTRACT

An apparatus for and method of resolving multiple centroids from data received from a multi-touch sensor device are described.

19 Claims, 5 Drawing Sheets

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 17 | 0 | 0 | 15 | 13 | 0 | 0 |
| 0 | 0 | 34 | 56 | 30 | 20 | 46 | 42 | 0 | 0 |
| 0 | 26 | 53 | 60 | 28 | 29 | 46 | 37 | 0 | 0 |
| 0 | 19 | 36 | 30 | 0 | 0 | 14 | 10 | 0 | 0 |
| 0 | 0 | 0 | 0 | 0 | 0 | 0 | 39 | 27 | 0 |
| 0 | 0 | 0 | 0 | 0 | 0 | 0 | 49 | 48 | 11 |
| 0 | 0 | 0 | 0 | 0 | 0 | 0 | 16 | 16 | 0 |
| 0 | 0 | 0 | 0 | 0 | 0 | 0 | 0 | 0 | 0 |

SENSOR ARRAY 410

205

ERROR

3 FINGERS PRESENT

ONLY 1 CALCULATED CENTROID 207

MULTIPLE TOUCH RESOLVE

REFERENCE TO RELATED APPLICATION

This application claims the benefit of U.S. Provisional Application No. 61/067,502 filed Feb. 27, 2008.

TECHNICAL FIELD

The present disclosure relates generally to touch sensor devices and, more particularly, to resolving multiple touches on a multi-touch sensor device.

BACKGROUND

One type of touchpad operates by way of capacitance sensing utilizing capacitance sensors. The capacitance detected by a capacitance sensor changes as a function of the proximity of a conductive object to the sensor. The conductive object can be, for example, a stylus or a user's finger. In a touch-sensor device, a change in capacitance detected by each sensor in the X and Y dimensions of the sensor array due to the proximity or movement of a conductive object can be measured by a variety of methods. Regardless of the method, usually an electrical signal representative of the capacitance detected by each capacitive sensor is processed by a processing device, which in turn produces electrical or optical signals representative of the position of the conductive object in relation to the touch-sensor pad in the X and Y dimensions. A touch-sensor strip, slider, or button operates on the same capacitance-sensing principle.

One type of touchpad is composed of a matrix of rows and columns. Within each row or column, there are multiple sensor elements. However, all sensor pads within each row or column are coupled together and operate as one long sensor element. The number of touches a touchpad can detect is not the same as the resolution of the touchpad. For example, even though a current touchpads may have the capability to detect two substantially simultaneous touches with an XY matrix, such touchpads cannot resolve the location of the two substantially simultaneous touches. One way to resolve the location of a second touch is if the touches arrive sequentially in time. This allows the remaining three potential locations to be evaluated to determine which locations are "actual touch" locations and which are invalid touches, also referred to as "ghost touch" locations. If both touches arrive or are detected substantially simultaneously, there is no way to resolve which of the two pairs of potential locations constitute "actual" touches, instead of invalid touches (e.g., "ghost" touches). Thus, the such two-axis touchpads are configured to resolve only a location of a single touch. Similarly, current touch screens are designed to detect the presence and location of only a single touch.

BRIEF DESCRIPTION OF THE DRAWINGS

Embodiments of the present invention are illustrated by way of example and not intended to be limited by the figures of the accompanying drawings in which like references indicate similar elements and in which.

DETAILED DESCRIPTION

In the following description, for purposes of explanation, numerous specific details are set forth in order to provide a thorough understanding of embodiments of the present invention. It will be evident, however, to one skilled in the art that the present invention may be practiced without these specific details. In other instances, well-known circuits, structures, and techniques are not shown in detail or are shown in block diagram form in order to avoid unnecessarily obscuring an understanding of this description. Reference in the description to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment. It should be noted that although embodiments may be described in regards to a "finger" touch, the term "touch" as used herein refers to the presence (i.e., in contact or close enough proximity for detection) of a conductive object (such as a finger or conductive stylus).

A method of resolving multiple centroids from data received from a multi-touch sensor device is described. In one embodiment, a peak detection method is used that increases the ignored touch signal level to such that each peak is isolated. The peaks correspond to the difference in count values, between a stored value for no sensor element activation and an acquired value with sensor element activation, for each of the sensor elements of a touch sensor array that are scanned. The counts are directly proportional to the sensed signal (e.g., capacitance) for a sensor element. Active elements within each peak are then used to determine multiple centroids. The active elements are the sensors elements that are determined to have a difference count above a presence threshold value. Such a dynamic peak detection threshold may ensure a maximum signal to noise ratio for any particular number of fingers (more fingers will be less signal to noise).

Figure 1A:
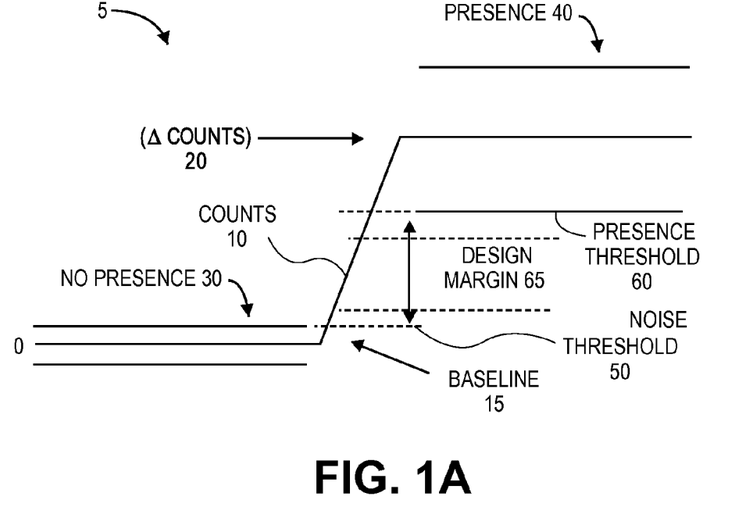
FIG. 1A illustrates a graph of a difference count of a single sensor element according to an embodiment.
Figure 4:
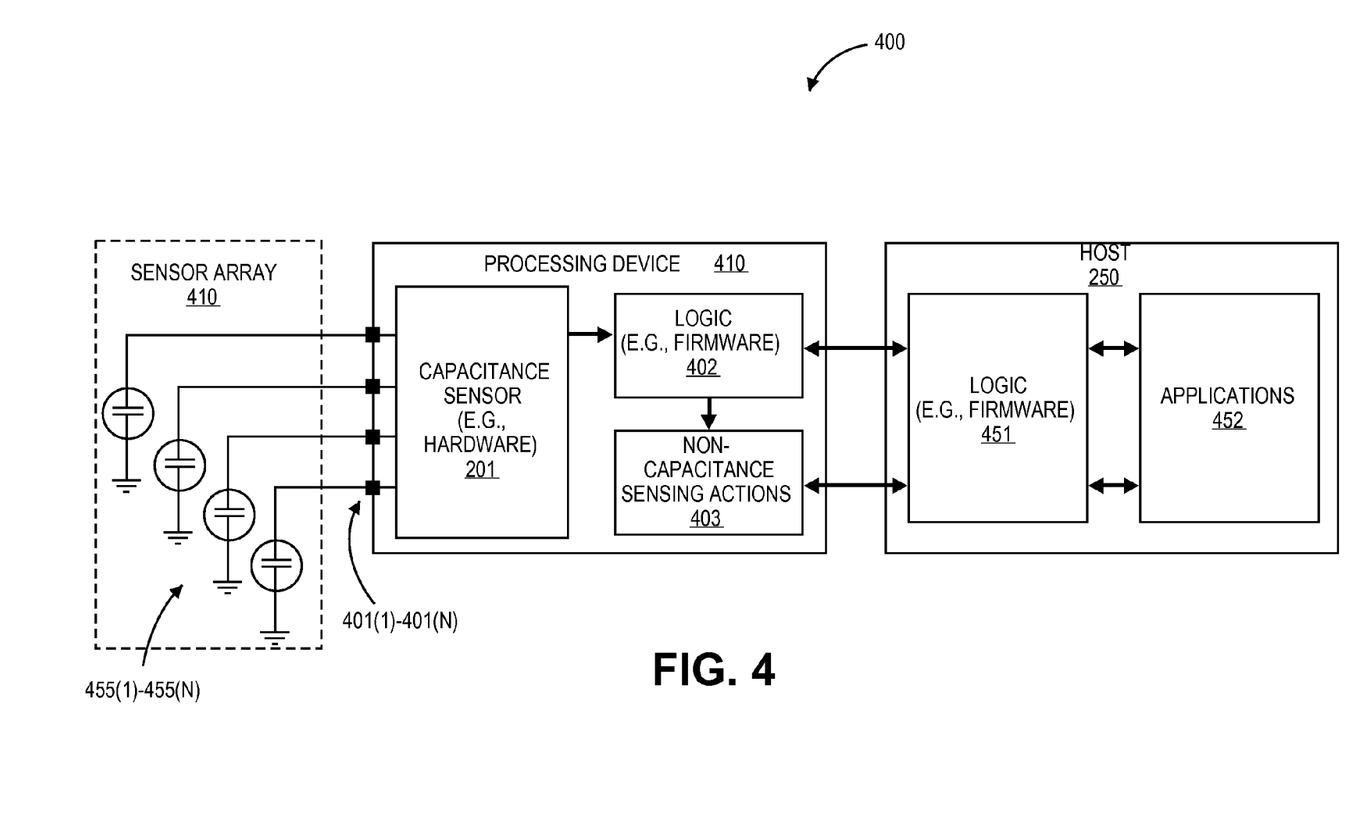
FIG. 4 illustrates a block diagram of one embodiment of an electronic device including a processing device that includes a capacitance sensor for measuring the capacitance on a sensor array and logic implementing embodiments of the present invention.

FIG. 1A illustrates a graph of a difference count of a single sensor element. At startup (or boot) of a touch sensor array, the sensor elements 455(1)-455(N) (N is a positive integer value that represents the number of sensor elements, where N is equal to four in the figures, but may be less or more than four) of a touch sensor array 410, as illustrated in FIG. 4, are scanned and the count values for each sensor element with no activation are stored as a baseline 15. The presence of a finger on a sensor element is determined by the difference in counts between a stored value for no sensor element activation and an acquired value with sensor element activation, referred to as a difference count (Δ Counts) 20.

Graph 5 includes the counts 10 as measured on a single sensor element for "no presence" 30 on the sensor element, and for "presence" 40 on the sensor element. "No presence" 30 is when the sensing device does not detect the presence of the conductive object, such as a finger. "No presence" 30 may be configured to be detected above a noise threshold 50. So long as the counts 10 are measured as being above negative threshold 50, the sensing device detects "no presence". "Presence" 40 is when the sensing device detects the presence of the conductive object (e.g., finger) on the sensor element. In one embodiment, presence 40 is detected when the counts 10 are greater than noise threshold 50. In another embodiment, presence 40 is detected when the counts 10 are greater than a presence threshold 60. The presence threshold may be used to include a design margin 65 in determining that a presence of a conductive object is detected on the sensing element.

Figure 1B:
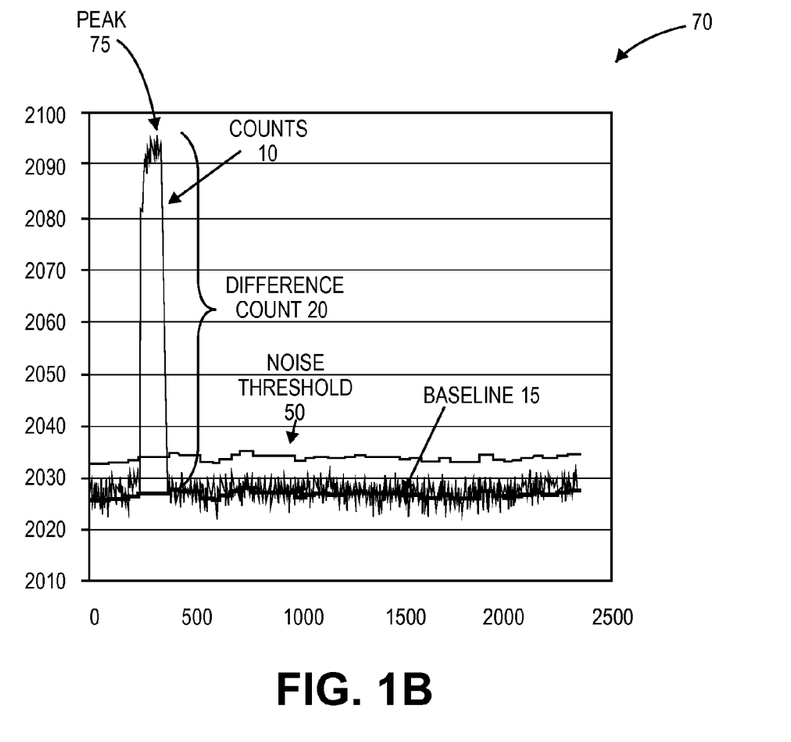
FIG. 1B illustrates a graph of capacitance measured on a single sensor element according to an embodiment.

FIG. 1B illustrates a graph of peak capacitance measured on a single sensor element. The graph 70 illustrates the measured capacitance as counts, as well as the baseline 15. A baseline 15, or reference, may be tracked so the processing device 210 of FIG. 4 knows when the user interaction is present (e.g., finger on sensor element) by comparing the counts 10 (representing the capacitance due to the presence of a conductive object, such as user's finger) with the baseline 15. The baseline counts 15 are the counts that normally occur on a fingerless sensor. The difference counts 20 are counts that exceed the baseline threshold 15. A noise threshold count 50 may be set so that the processing device 210 can discriminate between noise and when the user interaction is present (e.g., finger on sensor element). For example, without the presence of a finger on a sensor, the baseline 15 may be 2030 counts. When a finger is present, the counts 10 go up to, for example, to 2095 (and thus the difference count 20 is 45) which is above noise threshold 50 and results in the peak 75 being detected by the peak detection algorithm that is used. It should be noted that the values provide in FIG. 1B are only for illustrative purposes. In alternative embodiments, other thresholds such as a negative noise threshold and a presence threshold 60 may be used.

Figure 2A:
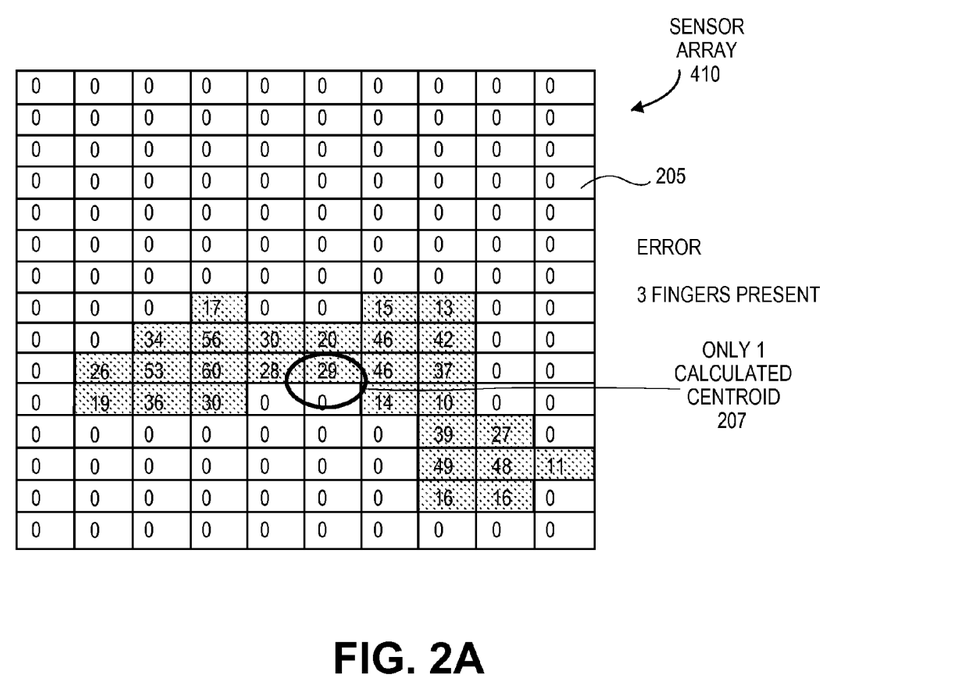
FIG. 2A illustrates a result of using a centroid algorithm for resolving simultaneous multiple finger touches according to an embodiment.

FIG. 2A illustrates the incorrect result of using a centroid algorithm for resolving multiple simultaneous finger touches. In this example, 3 fingers are touching the sensor array 410. Each of the squares (e.g., square 205) represents a physical sensor (e.g., 455(1)-455(N)) in the touch sensor array 410. The numbers in the squares are difference counts 20. An active sensor elements is one that has a difference count (i.e., the squares containing non-zero values). The contact area of a finger on a sensor array 410, or touch-pad, is often larger than any single sensor element. In order to calculate the interpolated position of a finger using a centroid, the sensory array 410 is first scanned to verify that a given sensor element location is valid. The specification for a valid location is for some number of adjacent sensor element signals to be above a noise threshold 50. When the strongest signal is found, this signal and those immediately adjacent are used to compute a centroid:

$$\text{Centroid} = \frac{n_{i-1} \cdot (i-1) + n_i i + n_{i+1} \cdot (i+1)}{n_{i-1} + n_i + n_{i+1}}$$

where n is a signal of a sensor element and i is the location of the strongest signal sensor element. In order to report the centroid to a specific resolution, for example a range of 0 to 100 (units relative to a desired resolution) for 12 sensor elements, the centroid value may be multiplied by a calculated or predetermined scalar. Alternatively, the interpolation and scaling operations may be combined into a single calculation and report this result directly in the desired scale. In the example of FIG. 2A, although 3 fingers are present, only one centroid 207 is calculated resulting in a determination that no fingers are present.

Figure 2B:
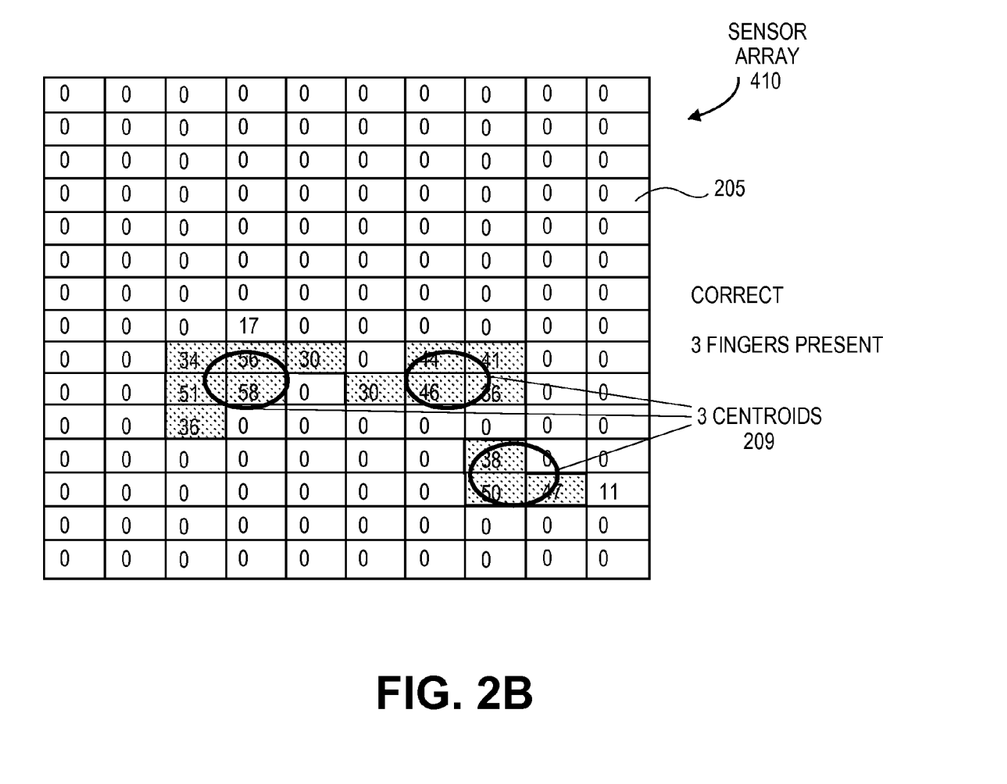
FIG. 2B illustrates a result of resolving multiple simultaneous finger touches using a method according to one embodiment of the present invention.

FIG. 2B illustrates the result of resolving multiple simultaneous finger touches using a method according one embodiment of the present invention. As discussed above, each of the squares (e.g., square 205) represents a physical sensor element in the touch sensor array 410. The numbers in the squares are difference counts resulting from a scan of the sensor array 410. Each number in the squares corresponds to an exemplary difference count 20 for the sensor elements that is generated by a capacitance sensor 201, as discussed below in relation to FIG. 4. A method embodiment uses the peaks of the active elements on sensor array 410 to determine multiple centroids. The active sensor elements are one that have a difference count (i.e., the squares containing non-zero values) above a noise threshold. Using a method embodiment, for example, 3 centroids 209 are calculated with 3 fingers being correctly identified as being present as compared with a single centroid calculation using the technique as shown in FIG. 2A.

The variables of the peak detection method according to one embodiment of the present invention are as follows. The Total Weight is the sum of all differences counts of the evaluated sensor elements (e.g., total weight of 17+34+56+30+51+58+36=282 for the left most finger illustrated in FIG. 2B). The Minimum Finger Weight is the minimum weight for a valid centroid. The Noise Threshold is the minimum difference count for a sensor element to be involved in a centroid calculation. The Maximum Total Weight is a constant that may be set per touch sensor device. Certain values such as, for example, the noise threshold, the Minimum Finger Weight and the Maximum Total Weight may be predetermined and set prior to scan of the sensor array, operation 320.

Figure 3:
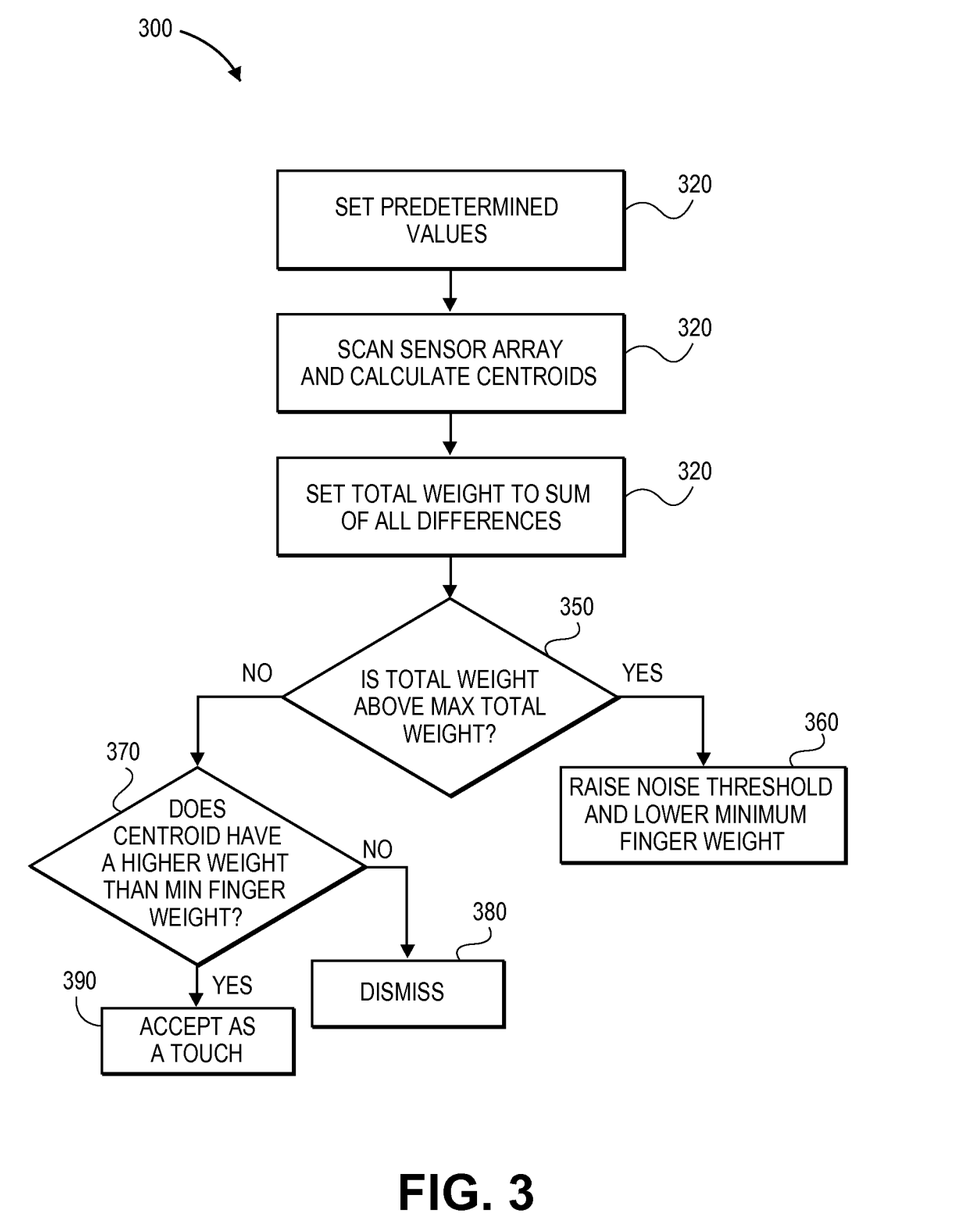
FIG. 3 illustrates a method of resolving multiple touches in accordance with one embodiment of the present invention.

FIG. 3 illustrates a method of resolving multiple touches in accordance with one embodiment of the present invention. In one embodiment, the method 300 includes the following operations. The sensor elements of sensor array 410 are scanned and one or more centroids are calculated (e.g., using the centroid algorithm described above) based on the difference counts determined for the active sensor elements, operation 330. A Total Weight is calculated to be a sum of all difference counts in the sensor array 410, operation 340. Then, the Total Weight is evaluated to determine if it is above a Maximum Total Weight, operation 350. If the Total Weight is determined to be above the Maximum Total Weight, the Noise Threshold (i.e., for which some number of adjacent sensor element signals are to be above in considering a sensor element location to be valid) is raised by a value (e.g., empirically predetermined) and the Minimum Finger Weight is lowered by a value (e.g., empirically predetermined), operation 360. After which, the method returns to operation 340, else the method continues to operation 370. In operation 370, all the centroids are evaluated to determine which have a higher weight then the Minimum Finger Weight. If a centroid is determined to not to have a higher weight than Minimum Finger Weight, then the centroid will be dismissed (i.e., finger not determined to be present), operation 380. Otherwise, if a centroid is determined to have a higher weight than the Minimum Finger Weight, then the centroid will be accepted (i.e., finger determined to be present), operation 380.

In one embodiment, the variable values are predetermined and set based on empirical analysis of one or more manufactured touch pads for production as noted above. In alternative embodiments, one or more of the variable values may be predetermined by other methods, instead of using an empirically found value noted in the above embodiment. It should be noted that the above algorithm may have different variable names and may increment and decrement the particular variables by different step values. In addition, centroid algorithms other than the one provided above may be used in embodiments of the present invention method. The method described above may be performed by processing device 210 as discussed below in relation to FIG. 4.

In alternative embodiments, other methods may be used that keep raising the noise threshold until the total weight is below a maximum total weight while lowering the minimum finger weight. For example, the particular variables in the algorithm above may be incremented and decremented by different step values. In another embodiment, a presence threshold may be used instead of, or in conjunction with, the noise threshold.

An advantage of embodiments of the described methods may include a maximum signal to noise (SNR) reached for any number of fingers on the sensors of the array.

FIG. 4 illustrates a block diagram of one embodiment of an electronic device 400 including a processing device that includes a capacitance sensor for measuring the capacitance on a sensor array and logic implementing embodiments of the present invention discussed above. The electronic device 400 includes the sensor array 410, processing device 210, and host 250. The sensor array 410 may be a single set of sensor elements that are disposed in at least one dimension of the touch-sensor device. The sensor array 410 is coupled to pins 401(1)-401(N) of the processing device 210. Each sensor element is represented as a capacitor. Sensor array 410 includes sensor elements 455(1)-455(N), where N is a positive integer value that represents the number of sensor elements of the sensor array 410. Although only four sensor elements 455(1)-455(N) are illustrated, the set of sensor elements may include more or less sensor elements than four. In one embodiment, the capacitance sensor 201 may include a selection circuit (not illustrated). The selection circuit is coupled to the sensor elements 455(1)-455(N) and the sensing circuitry of the capacitance sensor 201. The selection circuit may be used to select which of the multiple sensor elements to provide the charge current and to measure the capacitance of each sensor element.

The processing device 210 further includes a logic block 402 to implement embodiments of the method described above. The operations of logic block 402 may be implemented in firmware; alternatively, it may be implemented in hardware or software. Processing device 210 may also include hardware or firmware for performing non-capacitance sensing actions 403. Alternatively, instead of performing the operations of the logic 402 in the processing device 210, the processing device 201 may send the raw data to the host 250 for operation by logic 451. The operations of logic 451 may also be implemented in firmware, hardware, and/or software. Also, as described above, the host may include high-level APIs in applications 452 that perform routines on the received data, such as compensating for sensitivity differences, other compensation algorithms, baseline update routines, start-up and/or initialization routines, interpolation operations, scaling operations, or the like. The operations described with respect to the logic 402 may be implemented in logic 451, applications 452, or in other hardware, software, and/or firmware external to the processing device 210.

Various known circuitry may be used to implement capacitance sensor 201 for detection of capacitive sensor activation. For example, such detection may be performed utilizing a capacitive switch relaxation oscillator (CSR). The CSR may be coupled to an array of sensor elements using a current-programmable relaxation oscillator, an analog multiplexer, digital counting functions, and high-level software routines as discussed above.

It should be noted that there are various known methods for measuring capacitance with a capacitance sensor. The present embodiments are not limited to using relaxation oscillators, but may include other methods known in the art, such as current versus voltage phase shift measurement, resistor-capacitor charge timing, capacitive bridge divider, charge transfer, sigma-delta modulators, charge-accumulation circuits, or the like. Additional details regarding these alternative embodiments are not included so as to not obscure the present embodiments, and because these alternative embodiments for measuring capacitance are known by those of ordinary skill in the art. A processing device having a capacitance sensor can be obtained from Cypress Semiconductor Corporation. Alternatively, processing devices having capacitance sensors may be obtained from other companies.

Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method comprising:
   measuring a capacitance of a plurality of capacitance sensors;
   identifying at least one peak sensor of the plurality of capacitance sensors;
   in a first subtraction function, subtracting a first predetermined value from the measured capacitance of each of the plurality of capacitance sensors;
   in a first summing function, summing the result of the first subtraction function for the plurality of capacitance sensors; and
   in a first comparing function, comparing the result of the first summing function to a first threshold; and
     if the result of the first summing function is greater than the first threshold, increasing the first predetermined value and repeating the first subtraction, summing, and comparing function, and
     if the result of the first summing function is not greater than the first threshold, calculating a centroid for each of the at least one peak sensor.

2. The method of claim 1, further comprising:
   in a second summing function, summing result of the first subtraction function for each capacitance sensor of the plurality of capacitance sensors of each centroid;
   in a second comparing function, comparing the result of the second summing function to a second threshold; and
     if the result of the second comparing function is greater the second threshold, proceeding to the calculating a centroid, and
     if the result of the second comparing function is not greater than the second threshold, decreasing second threshold and repeating the first subtraction function and the first and second summing and comparing functions.

3. The method of claim 1, wherein the measured capacitances of the plurality of capacitance sensors is compared to a noise threshold and if the measured capacitances are less than the noise threshold, the measured capacitances are ignored.

4. The method of claim 1, wherein the peak sensor is identified by comparing each sensor to each of the plurality of sensors surrounding it and determining that the sensor is a peak if the measured capacitance is greater than the measured capacitance of the surrounding sensors.

5. The method of claim 1, wherein the first predetermined value and the first threshold are based on an empirical analysis of one or more manufactured touch sensor arrays.

6. The method of claim 1, wherein the first and second predetermined values and the first and second thresholds are based on an empirical analysis of one or more manufactured touch sensor arrays.

7. The method of claim 1, wherein the measuring the capacitance of the plurality of sensors comprises:
converting a the capacitance to a digital value;
subtracting a baseline value from each of the measured capacitance values for the plurality of sensors; and
generating a difference count value representative of the change in capacitance for each of the plurality of sensors.

8. A capacitance sensing circuit comprising:
a plurality of capacitance sensing inputs coupled to a plurality of capacitance sensors; and
a processing device configured to:
measure capacitance on a plurality of capacitance sensors,
identify at least one peak sensor of the plurality of capacitance sensors,
in a first subtraction function, subtract a first predetermined value from the measured capacitance of each of the plurality of capacitance sensors,
in a first summing function, sum the result of the first subtraction function for the plurality of capacitance sensors,
in a first comparing function, compare the result of the first summing function to a first threshold,
if the result of the first summing function is greater than the first threshold, increase the first predetermined value and repeat the first subtraction, summing, and comparing function, and
if the result of the first summing function is not greater than the first threshold, calculate a centroid for each of the at least one peak sensor.

9. The capacitance sensing circuit of claim 8, wherein the processing device is further comprising:
in a second summing function, sum result of the first subtraction function for each capacitance sensor of the plurality of capacitance sensors of each centroid;
in a second comparing function, compare the result of the second summing function to a second threshold; and
if the result of the second comparing function is greater the second threshold, proceed to the calculating a centroid, and
if the result of the second comparing function is not greater than the second threshold, decrease second threshold and repeat the first subtraction function and the first and second summing and comparing functions.

10. The capacitance sensing circuit of claim 9, wherein the processing device is configured to compare the measured capacitances to a noise threshold and if the measured capacitances are less than the noise threshold, ignore the measured capacitances.

11. The capacitance sensing circuit of claim 9, wherein processing device is configured to compare the capacitance of each sensor to those surrounding it and identifying a capacitance sensor as a peak if the measured capacitance is greater than the measured capacitance of the surrounding sensors.

12. The capacitance sensing circuit of claim 8, wherein the first predetermined value and the first threshold are based on an empirical analysis of one or more manufactured touch sensor arrays.

13. The capacitance sensing circuit of claim 9, wherein the first and second predetermined values and the first and second thresholds are based on an empirical analysis of one or more manufactured touch sensor arrays.

14. The capacitance sensing circuit of claim 9, wherein for the measuring capacitance the processor is configured to:
convert a the capacitance to a digital value;
subtract a baseline value from each of the measured capacitance values for the plurality of sensors; and
generate a difference count value representative of the change in capacitance for each of the plurality of sensors.

15. An apparatus comprising:
a plurality of capacitance sensing inputs coupled to a plurality of capacitance sensors; and
a processing device configured to:
measure capacitance on a plurality of capacitance sensors;
identify at least one peak sensor of the plurality of capacitance sensors;
in a first subtraction function, subtract a first predetermined value from the measured capacitance of each of the plurality of capacitance sensors;
in a first summing function, sum the result of the first subtraction function for the plurality of capacitance sensors; and
in a first comparing function, compare the result of the first summing function to a first threshold; and
if the result of the first summing function is greater than the first threshold, increase the first predetermined value and repeat the first subtraction, summing, and comparing function, and
if the result of the first summing function is not greater than the first threshold, calculate a centroid for each of the at least one peak sensor.

16. The apparatus of claim 15, wherein the processing device is further comprising:
in a second summing function, sum result of the first subtraction function for each capacitance sensor of the plurality of capacitance sensors of each centroid;
in a second comparing function, compare the result of the second summing function to a second threshold; and
if the result of the second comparing function is greater the second threshold, proceed to the calculating a centroid, and
if the result of the second comparing function is not greater than the second threshold, decrease second threshold and repeat the first subtraction function and the first and second summing and comparing functions.

17. The apparatus of claim 16 wherein at least one operation performed by the processing device is performed by a host processor separate to the capacitance measurement processing device.

18. The apparatus of claim 16, wherein the processing device is configured to compare the capacitance of each sensor to those surrounding it and identifying a capacitance sensor as a peak if the measured capacitance is greater than the measured capacitance of the surrounding sensors.

19. The apparatus of claim 16, wherein for the measuring capacitance the processor is configured to:
convert a the capacitance to a digital value;
subtract a baseline value from each of the measured capacitance values for the plurality of sensors; and generate a difference count value representative of the change in capacitance for each of the plurality of sensors.

\* \* \* \* \*